United States Patent [19]

Veazey et al.

[11] Patent Number: 4,690,983
[45] Date of Patent: Sep. 1, 1987

[54] HYDROGENATED POLY(ALLOOCIMENE)

[75] Inventors: Richard L. Veazey, East Windsor, N.J.; Kathryn S. Hayes, Norristown, Pa.

[73] Assignee: Union Camp Corporation, Wayne, N.J.

[21] Appl. No.: 927,231

[22] Filed: Nov. 5, 1986

[51] Int. Cl.$^4$ .............................................. C08F 8/04
[52] U.S. Cl. .................. 525/331.9; 525/338; 525/339; 526/290; 526/340.3
[58] Field of Search ............... 525/331.9; 526/290, 526/340.3

[56] References Cited

U.S. PATENT DOCUMENTS

| | | | |
|---|---|---|---|
| 2,406,575 | 8/1946 | Young et al. ..................... | 525/331.9 |
| 3,278,641 | 10/1966 | Bell, Jr. .............................. | 526/340.3 |
| 3,373,149 | 3/1968 | Doyle, Jr. ............................ | 528/393 |
| 3,715,341 | 2/1973 | Velzmann ........................... | 528/374 |
| 3,929,850 | 12/1975 | Streck et al. ....................... | 526/279 |
| 3,939,131 | 2/1976 | Morikawa et al. ................. | 526/308 |
| 4,169,116 | 9/1979 | Trotter et al. ..................... | 525/210 |
| 4,229,549 | 10/1980 | Usami et al. ....................... | 525/308 |
| 4,282,337 | 8/1981 | Roggero et al. ................... | 525/285 |
| 4,288,359 | 9/1981 | Trotter et al. ..................... | 525/232 |
| 4,524,187 | 6/1985 | Greco et al. ....................... | 525/342 |

Primary Examiner—Joseph L. Schofer
Assistant Examiner—Bernard Lipman
Attorney, Agent, or Firm—Edward J. Sites

[57] ABSTRACT

Hydrogenated 2,3- and 6,7-poly(alloocimene) is described. The polymer is useful as flexibilizing agents in elastomeric coatings and as tack modifiers in pressure sensitive adhesives.

5 Claims, 1 Drawing Figure

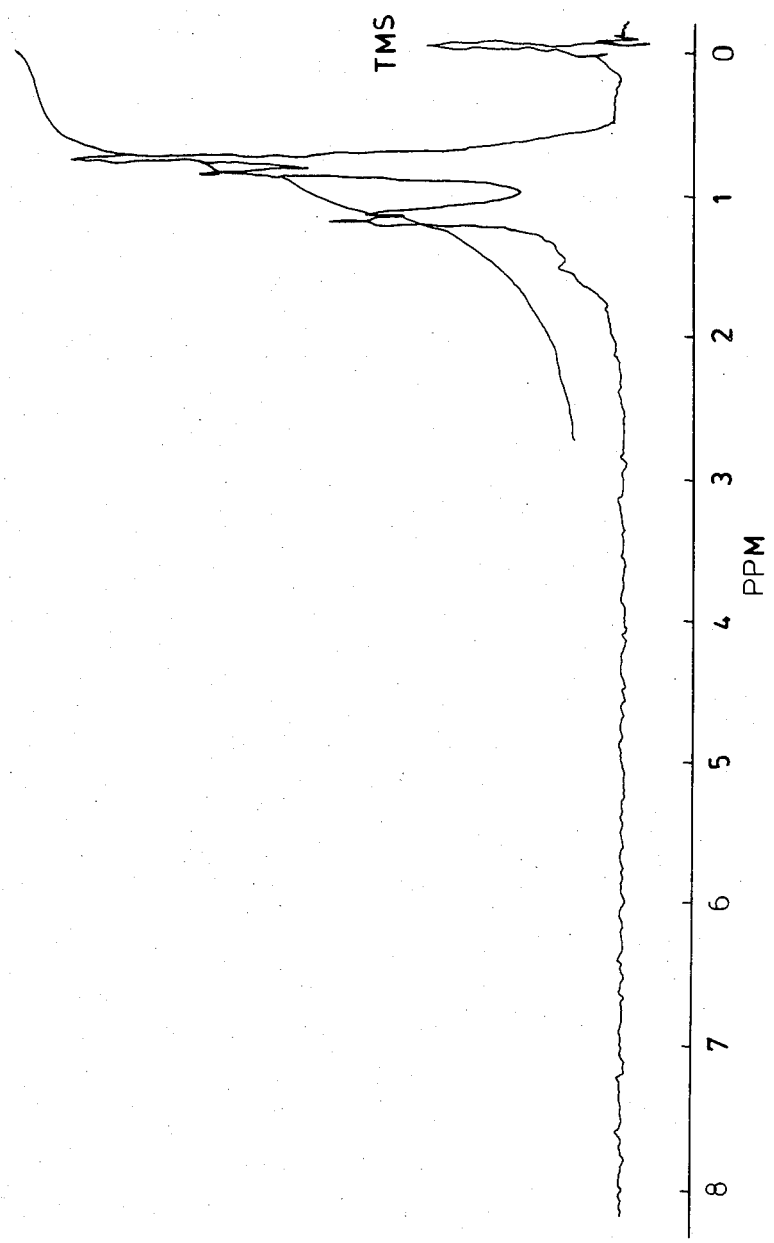

HYDROGENATED POLY(ALLOOCIMENE)

The invention relates to hydrogenated 2,3- and 6,7-poly(alloocimene).

BACKGROUND OF THE INVENTION

Hydrogenation of polymers and terpene resins has been known in the prior art for some time. Carmody disclosed in U.S. Pat. No. 2,249,112 the use of Raney-type catalysts to hydrogenate alpha- and beta-pinene resins. Colorless resins having a sweet pleasant odor were prepared. In 1947 Carmody and Carmody patented the use of copper chromite and black copper oxide in U.S. Pat. Nos. 2,416,901 and 2,416,902, respectively to catalytically promote hydrogenations. Reference was made to the fact that relatively high temperatures (up to 225° C.) and pressures (up to 2100 psig) were required along with high catalyst loadings in order to bring about the reaction of hydrogen with the terpene resin.

Although cationically polymerized poly(alloocimene) has been described in U.S. Pat. Nos. 2,351,786, 2,373,419 and 2,383,084, no reference has been made to the preparation of 2,3- and 6,7-poly(alloocimene) and hydrogenated 2,3- and 6,7-poly(alloocimene) nor to the usefulness of this polymer.

SUMMARY OF THE INVENTION

The invention comprises a hydrogenated poly(alloocimene) polymer. Preferred polymers of the invention have glass transition temperatures less than 0° C., and are derived from the reaction of gaseous hydrogen with 2,3- and 6,7-poly(alloocimene) having conjugated double bonds in pendant side chains.

The polymers of the invention are useful as flexibilizing materials in elastomeric coatings and as tack modifiers in pressure sensitive adhesives.

The term "hydrogenated" as used herein includes a partial hydrogenation, i.e., a polymer which contains some residual unsaturation. It may as well denote substantially complete saturation of the polymer.

BRIEF DESCRIPTION OF THE DRAWING

The drawing is of a nuclear magnetic resonance spectrum of the hydrogenated poly(alloocimene) of the invention prepared in accordance with the procedure of Example 2, infra.

DETAILED DESCRIPTION OF THE INVENTION

The preferred compounds of the invention are derivatives of alloocimene polymers which may comprise mixtures of the chain units having the formulae:

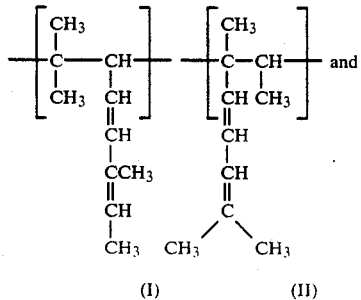

(I)          (II)

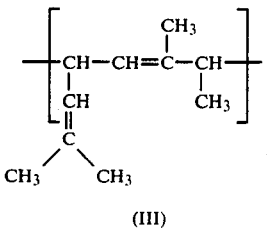

(III)

These poly(alloocimene) polymers comprise mixtures of a majority of chain moieties (I) and (II) as a group and a minority of chain moiety (III). We define 2,3- and 6,7-poly(alloocimene) as that poly(alloocimene) composition comprising greater than 50 weight percent of 2,3-poly(alloocimene), (I), and 6,7-poly(alloocimene), (II), and less than 50 weight percent of 4,7-poly(alloocimene), (III).

The 2,3- and 6,7-poly(alloocimene) of the present invention may be prepared in the following manner: substantially anhydrous alloocimene is added slowly to a catalyst system comprised of an active metal catalyst component dispersed in a substantially anhydrous ether component under an inert gas atmosphere. Controlled reaction by slow alloocimene addition is advantageous because the polymerization is highly exothermic. It is preferred that the alloocimene feed be essentially free of peroxides, epoxides, water, and alcohols. The metal polymerization catalyst components may be any alkali metal or calcium, substantially free of surface oxides or other contaminants and being present at a concentration of less than about 10 mole percent of the alloocimene. The active metal catalyst component may be present as spheres, wire, foil, or finely divided dispersion and may be in the pure state, as a mixture or an alloy, or as a solution with aromatic hydrocarbons, such as naphthalene, 2-methylnaphthalene, and the like.

The ether catalyst components used in the polymerization are aliphatic or cycloaliphatic ethers. The ethers are preferred in amounts of greater than about 5 weight percent of the alloocimene. The ether components most preferred are tetrahydrofuran and 1,2 dimethoxylethane. Inert hydrocarbon solvents and diluents may be present, for example, benzene, toluene, xylene, ethylbenzene, pentane, hexane, cyclohexane, heptane, octane, nonane, limonene, para-cymene, and the like, or mixtures thereof.

The polymerization may be carried out at temperatures of from about −78° C. to about 100° C., with reaction times of from about 10 minutes to about 500 hours. Most preferably the polymerizations are carried out at temperatures of from about −30° C. to about 60° C., with reaction times of from about 1 to about 8 hours. The progress of the polymerization may be followed by conventional analytical techniques, such as liquid chromatography.

When the polymerization is complete, addition of a proton source, for example, water, an acid, an alcohol, or mixtures thereof, in molar excess of the alkali metal catalysts terminates the reaction and thereby introduces hydrogen atoms at the ends of the polymeric chain.

Following the polymerization, the reaction mixture containing the poly(alloocimene) is advantageously subjected to distillation to remove the ether solvent and unreacted reagent. Care must be taken not to exceed a temperature of about 150° C. in the distillation pot containing the polymer, otherwise excessive thermal degradation of the polymer will occur. The polymer may be discharged while still molten onto a polytetrafluoroethylene coated glass fabric or other suitable surface and allowed to cool. The cooled polymer may then be packaged under a nitrogen atmosphere to protect it from oxidation.

A second polymer isolation procedure, although not requisite, may be employed especially for higher molecular weight poly(alloocimene). This method involves cautious transfer of the terminally active polymer and diluents into a large excess of a nonsolvent, such as methanol, or the like. The poly(alloocimene) precipitates as a white solid. Collecting, redissolving, and reprecipitating the poly(alloocimene) solid several times gives, after finally drying, a poly(alloocimene) free of low molecular weight impurities. The dried, isolated poly(alloocimene) may then be packaged and stored in a nitrogen atmosphere.

It is advantageous to add an antioxidant, such as 2,6-di-tert-butyl-4-methylphenol or the like, prior to distillative isolation, or in the final precipitation solvent to protect the poly(alloocimene) from oxidizing.

The poly(alloocimene) employed to prepare the hydrogenated polymers of the invention is advantageously the homopolymer of alloocimene having a weight average molecular weight of from about 500 to 100,000 and which contains repeating or recurring chain moieties of the formulae (I), (II) and (III) given above in the ratios described above.

The preferred hydrogenated poly(alloocimene) polymers of the present invention are made up of the repeating and/or recurring chain moieties of the formulae (I), (II) and (III) given above wherein one or more, including all, of the double bonds are saturated by the addition of hydrogen atoms. Typically, a preferred polymer of the invention will comprise mixtures of the chain moieties (I), (II) and (III) described above, made up of a majority of the units of formulae (I) and (II) and a minority of the units of formula (III) wherein hydrogenation has saturated some or all of the double bonds depicted in the formulae (I), (II) and (III).

The amount of any residual unsaturation remaining in the poly(alloocimene) after hydrogenation is a measure of how much hydrogenation took place. If one or more of the double bonds in each poly(alloocimene) polymer unit is reduced, glass transition temperatures of less than 0° C. can be achieved. One measure of the amount of unsaturation in an organic material and the measure that is typically used to determine unsaturation in polymers is the iodine value test. This test measures the amount of iodine monochloride that reacts with a double bond. The iodine value of the poly(alloocimene) with half of the double bonds reduced is about 187. As shown in the table below, partially hydrogenated poly(alloocimene) of Example 1, had an iodine value of 178, which implies slightly less than one double bond per chain unit left in the polymer. The fully hydrogenated poly(alloocimene) of Example 2, had an iodine value of 4.

Further evidence for hydrogenation of poly(alloocimene) is obtained from ultraviolet spectral data. 2,3- and 6,7-poly(alloocimene) typically has an absorption maximum around 245 nm with a polymer unit molar absorptivity of greater than 10,000. When this poly(alloocimene) was reacted with hydrogen this absorptivity at 245 nm dropped to values around 100 or less as shown in the table below.

The hydrogenated polymer compounds of the invention possess a wide variety of molecular weights. Representative molecular weights are in the range of from about 500 to about 100,000.

The hydrogenated poly(alloocimene) of the instant invention may be prepared by a number of hydrogenation methods known in the prior art; see for example, C. W. Moberly, in *Encyclopedia of Polymer Science*, Vol. 7, H. F. Mark, N. G. Gaylord, and N. M. Bikales, ed., John Wiley and Sons, New York, 1967, pp. 557–568. More favorable hydrogenation conditions are high temperatures, within the range of from about 25° C. to 200° C., preferably within the range of from about 50° C. to 150° C. The exact choice of temperature may be made in conjunction with a selection of pressure. High hydrogen gas concentrations (pressures), high catalyst to polymer ratios, low dilutions of polymers, and polymers freed of sulfur impurities also optimize the desired reaction. Since very high temperatures and hydrogen concentrations can lead to destructive hydrogenations in which the polymer is broken down to lower molecular oligomers and monomers, reaction temperatures of no higher than 150° C. are preferred when hydrogenating poly(alloocimene). The hydrogen pressure employed may vary from about 1 atmosphere to about 100 atmospheres but is preferably within the range of 3 to 20 atmospheres.

To achieve very low iodine values; i.e. high levels of hydrogenation, double hydrogenations were found to be advantageous. Poly(alloocimene) is first reacted with hydrogen under pressure, isolated, and then reacted with hydrogen again in the presence of fresh catalyst.

In a typical hydrogenation, poly(alloocimene) is added to a pressure reactor which contains inert solvent and a hydrogenation catalyst. Stirring is initiated, the vessel pressurized with high purity hydrogen, and heated to the desired temperature for a specified length of time. Hydrogen may be charged periodically in order to maintain the desired pressure. The reaction is terminated when the hydrogen uptake ceases. The reactor and contents may then be cooled, the excess hydrogen vented, and the reactor purged with nitrogen. The catalyst is filtered from the solution, and the polymer isolated by distilling the solvent at reduced pressures.

A wide variety of hydrogenation catalysts are known. Representative of such catalysts are platinum, Raney nickel, rhodium, nickel, palladium, ruthenium and the like. The catalyst is advantageously supported on any of the carriers conventionally employed for this purpose in preparing hydrogenation catalysts. Examples of such carriers are alumina, carbon, kieselguhr, bentonite, asbestos, silica gel, zirconium oxide and the like. In supported catalysts, the amount of elemental catalyst employed may be within the range of from about 0.05 to about 40 percent by weight of the catalyst composition, preferably 1 to 20 percent; most preferably 2 to 10 percent. The methods of preparing supported catalysts are well known to those skilled in the art, and most are commercially available. The catalyst is employed in a catalytic proportion, which is generally a proportion of the elemental catalyst within the range of from about 0.1 to about 10 percent by weight of the poly(alloocimene).

Inert solvents, i.e.; a solvent for the polymer reactant which will not enter into or otherwise adversely affect the desired course of the hydrogenation is advantageously used in the preparation of the polymers of the invention. Preferably the solvent employed is a hydrocarbon solvent such as methylcyclohexane, n-hexane, decane, xylene and the like.

Progress of the desired hydrogenation may be followed by conventional analytical technique or by observation of the amounts of hydrogen taken up by the reaction mixture. The reaction may be terminated at any desired point, by reference to the theoretical quantity of hydrogen absorbed or taken up.

The following examples describe the manner and the process of making and using the invention and set forth the best mode contemplated by the inventors for carrying out the invention.

PREPARATION 1

To a clean, oven-dried, four neck round-bottom flask, equipped with a thermometer, nitrogen inlet, pressure equalizing addition funnel, a reflux condensor into which was inserted an inert gas exit adapter, and a Nicrome wire stirrer, was added sodium shot (46 g) and toluene (300 ml) which had been dried and distilled from calcium hydride. A nitrogen blanket was maintained in the reaction flask at all times. Heat was applied and stirring initiated. The toluene was allowed to gently reflux for 30 minutes, and then it was cooled. At this point tetrahydrofuran (250 ml) was added. A preweighed sample of the alloocimene (1242 g, 44.5% true) which had been dried over calcium hydride and distilled, was charged to the addition funnel. The polymerization temperature of 60° C. was maintained by applying heat with a heating mantle attached to a temperature sensing device. Polymerization was initiated by slowly adding the alloocimene mixture over a period of one hour to the stirred solvent containing sodium metal. After 4.5 hours, the polymerization was complete and the poly(alloocimene) was isolated by transferring the polymer solution into a separatory funnel containing methanol. After deactivation of the catalyst, water and toluene were added, and the polymer solution was thoroughly washed with water. The organic solution was then dried over anhydrous magnesium sulfate and filtered into a round-bottom flask. The solvent(s) was removed at reduced pressures. Any monoterpenes were isolated at approximately 65° C. (5 to 20 mm Hg.). The distillation was terminated when the temperature in the pot containing the polymer product reached about 150° C. The polymer was poured while hot into a pan, allowed to cool, then stored under nitrogen. The polymer yield was 402 g, about 73% of theory. It had a glass transition temperature of $-15°$ C. and a weight molecular weight of 1482.

PREPARATION 2

Poly(alloocimene) was prepared by the procedure of Preparation 1, supra., except 150 ml of dry toluene, 15 g of sodium, 126 ml of dry tetrahydrofuran, and alloocimene (620 g, of 46.7% pure alloocimene) were used. The properties measured on this material are reported in the table below.

EXAMPLE 1

Poly(alloocimene), 40.5 g, prepared by the procedure of Preparation 1, supra., was added to a clean dry 450 ml Parr Bomb reactor fitted with a stirrer, inlet and outlet vents (hard plumbed), a steel pipe water cooling line, and containing 4 grams of 5% palladium-on-carbon catalyst and about 100 g of decane. The reactor was sealed using a torque wrench set to 25 ft/lb. The hydrogen, nitrogen, water, and electrical lines were attached. A heating mantle was placed under the reactor. The cooling water was turned on and checked to determine that it was operated by the temperature controlling device. The stirrer was turned on and was set to rotate at a moderate rate of speed. The reactor was then pressurized with purified nitrogen to 25 psig and vented. This process was repeated. The reactor was pressurized to 100 psig, desired reaction pressure, and leak tested by observing the pressure drop over 5 minutes. The nitrogen was vented, and the reactor was pressurized to 25 psig hydrogen. The hydrogen was vented and the reactor pressurized again to 25 psig hydrogen, which likewise was vented. The reactor was pressured to 50 psig, one-half of the desired reaction pressure, the stirrer was checked to be sure it was turning, and the heat to the reactor was turned on. After the desired temperature of 150° C. had been achieved the hydrogen pressure was slowly increased to 100 psig. Hydrogen was periodically charged to the reactor in order to maintain the reaction pressure at 100 psig.

After 6 hours the heat to the reactor was turned off, and the reactor and contents allowed to cool for 18 hours. The excess hydrogen gas was vented, and the reactor was purged with purified nitrogen for a few minutes. The lines were removed from the reactor, and the reactor contents were gravity filtered. The reactor was rinsed with toluene which was also filtered and combined with the previous filtrate. The decane and toluene solvents were removed by vacuum distillation to leave a slightly gray semisolid material. Properties of this material are reported in the table below.

EXAMPLE 2

Poly(alloocimene), 40 g, of Preparation 2 was hydrogenated with 4.0 g of 5% palladium-on-carbon, in 100 grams of decane, at 150° C. for 6 hours, and at a hydrogen pressure of 100 psig according to the procedure of Example 1. The polymer isolated weighed 38.3 g and had an iodine value of 124. This material, 10 grams, was hydrogenated with 200 psig hydrogen in the presence of 50 g of decane and 1 g of 5% palladium-on-carbon for 4 hours according to the procedure of Example 1. Properties of this material are reported in the table below. The NMR spectrum of this material is shown in the accompanying drawing.

TABLE 1

| | Preparation 1 | Example 1 | Preparation 2 | Example 2 |
| --- | --- | --- | --- | --- |
| Iodine value | 240 | 178 | 250 | 4 |
| Weight average molecular weight | 1482 | 1395 | 2759 | 2773 |
| Glass transition temperature °C. | −15 | −37 | 7 | −47 |
| Polymer chain unit molar absorptivity at 245 nm | 11,500 | 108 | 12,700 | 22 |

The hydrogenated poly(alloocimene) of the invention may be added to elastomeric (polymeric) coating compositions in a proportion of from 1 to 10 percent by weight as a flexibilizing agent.

What is claimed is:

1. Hydrogenated 2,3- and 6,7-poly(alloocimene).
2. The polymer of claim 1 having residual unsaturation.
3. The polymer of claim 1 which is fully saturated.
4. The polymer of claim 1 having an iodine value of less than 190 centigrams of iodine per gram of sample.
5. The polymer of claim 1 having a glass transition temperature of less than 0° C.

* * * * *